Oct. 27, 1959 R. B. DE LANO, JR 2,909,972
DISPLAY APPARATUS EMPLOYING ELECTRO-OPTICAL DEVICES
Filed Sept. 15, 1958
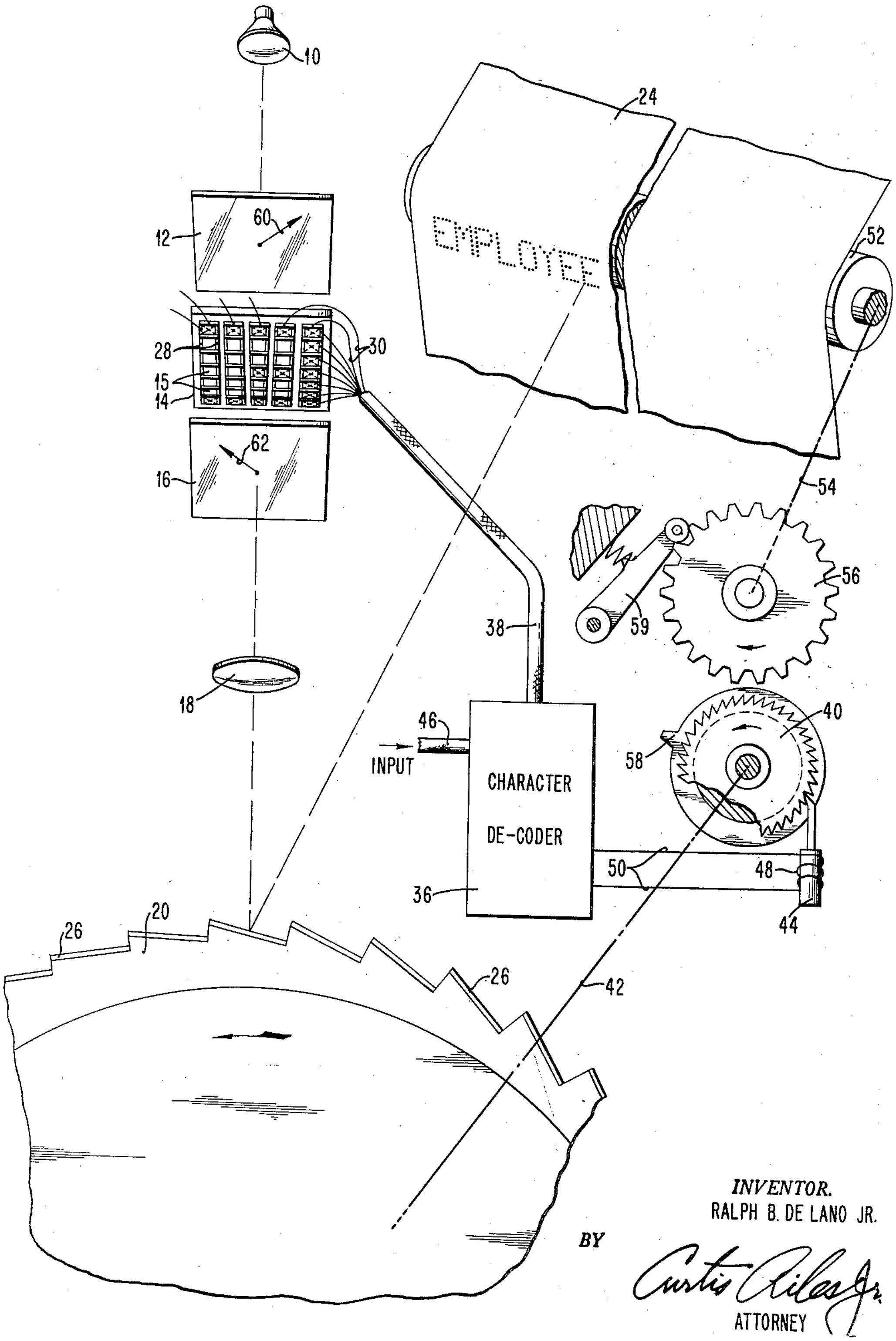
INVENTOR.
RALPH B. DE LANO JR.
BY Curtis Riles Jr.
ATTORNEY United States Patent Office 2,909,972

Patented Oct. 27, 1959

2,909,972

DISPLAY APPARATUS EMPLOYING ELECTRO-OPTICAL DEVICES

Ralph B. De Lano, Jr., Manchester Heights, N.Y., assignor to International Business Machines Corporation, New York, N.Y., a corporation of New York Application September 15, 1958, Serial No. 760,983

9 Claims. (Cl. 95—4.5)

This invention relates to fast acting apparatus for providing visual displays of information in the form of characters, and more particularly this invention relates to display and printing apparatus employing light switching elements incorporating electro-optically active materials which are responsive to electric signals in accordance with the Kerr electro optic effect.

In modern technology there are many requirements for rapid handling of information in electrical signal form which has been transmitted from one location to another or which has been subjected to processing by logical computing apparatus. In such apparatus, it is presently quite common to process a large body of information in an extremely short period of time. A problem then arises of rapidly converting such information to a form such as a printed page, or a visual display which is comparable to a printed page, which can be comprehended at the slower pace of the human mind.

Accordingly, it is an important object of the present invention to provide display and printing apparatus which is capable of very rapid operation.

Another object of the present invention is to rapidly provide information in the form of characters which are logically arranged in relation to one another to impart information.

Another object of the present invention is to provide display and printing apparatus which is fast enough to approach the output speed of information in the form of electrical signals from modern electronic data processing apparatus.

In previous attempts to provide faster and faster printing apparatus for use with electronic communication and data processing equipment, one of the major problems has been the inertia of mechanical parts which must be accelerated and decelerated very rapidly in the printing process, and the mechanical wear encountered by such mechanical parts.

Accordingly, another important object of the present invention is the provision of a rapid printing apparatus which avoids many of the previously encountered problems of moving mechanical parts.

In a related patent application Serial Number 761,129, filed concurrently with the present application by the present inventor jointly with A. C. Koelsch, Jr. and assigned to the same assignee as the present application, there is disclosed a specific system which is similar in many respects to the present invention. However, in that system an array of electro-optically active devices is used for displaying a character, and a second array of electro-optically active devices is employed for determining the position of the character in a larger display. The second array of electro-optically active devices can add greatly to the complexity and cost of the apparatus and add greatly to the optical losses of the system.

Accordingly, it is another important object of the invention to provide a system which does not require a second array of electro-optically active devices but which accomplishes the functions of the related system without a serious impairment of speed of operation.

Other objects and advantages of the invention will be apparent from the following description and claims and the accompanying drawings.

In carrying out the objects of this invention, in one preferred embodiment thereof, there are provided a light source and first and second light polarizers having a predetermined angular relationship between their axes of polarization, and a coordinate array of electro-optically active elements positioned between the polarizers. Electric switching apparatus is provided for selectively energizing individual elements of the coordinate arrangement to provide a light valve effect to transmit information in the form of characters through the second polarizer. Reflective apparatus is provided for reflection of such character information in sequence to different desired relative positions to form a display which may be in the form of a printed page.

In the drawing there is shown a schematic representation of a preferred form of the invention.

An important element of the present invention is a "light switch" or "light valve." As used in this specification, the light valve refers to a combination of apparatus which is capable of controlling the transmission of light in response to an electrical voltage signal. Light valves which are currently known, and of the type which are used in the present invention may employ, for instance, two light polarizers, each of which is capable of limiting the transmission of light therethrough to light which is in substantially one plane. The light polarizers are usually positioned with their angles of polarization displaced with respect to one another. Between the polarizers there is positioned an electro-optically active material which, as will be explained more fully below, displays birefringent properties such that the application of an electric potential of proper magnitude across the birefringent or electro-optically active material effectively rotates the plane of polarization of light passing therethrough. The angles of polarization of the light polarizers can be so arranged that, when the electro-optically active material is energized by an applied voltage, polarized light entering the electro-optically active material from the first polarizer is effectively rotated to the polarization angle of the second polarizer so as to be transmitted through the second polarizer. If such energization and rotation of polarization does not exist, the cooperative action of the two polarizers is effective, as is well known, to prevent the transmission of light through said second polarizer.

Referring more particularly to the drawing, there is shown a light source 10 and the following components arranged to receive and transmit the light source 10 in sequence: polarizer 12, electro-optically active structure 14, polarizer 16, lens 18, and a reflective mirror structure 20. Light which is transmitted through all of these elements is intercepted by a light sensitive paper 24. Light from source 10 which is polarized by the polarizer 12 is normally stopped by polarizer 16 except where individual electro-optically active portions 15 of structure 14 are subjected to a voltage change which effectively rotates the plane of polarization of light transmitted therethrough. By proper selection of portions 15 to be energized, a pattern of light transmission is formed which can thus form alphabetical letters, or numbers, or information in the form of other characters. The character in the form of a light pattern transmitted through the polarizer 16 is focused by the lens 18 to provide a reflected image focused upon paper 24.

The mirror structure 20 is made in the form of a rotatable cylinder and is provided with individual mirror elements 26 which are tilted at successively increasing angles from a tangential direction in respect to the associated portion of the circumference of the cylinder. Thus as the cylinder 20 is rotated and stopped at successive indexed positions to utilize successive reflective elements 26, the character images which are focused by reflection from the successive elements 26 appear at spaced positions upon the paper 24 to provide a conventional character spacing. After a complete line of characters is formed, such as by a full rotation of the cylindrical reflective mirror structure 20, the paper 24 is moved upwardly to provide space for another line, and the procedure is repeated to rapidly display and print the desired amount of information.

It is understood that the main body of structure 14 is composed of transparent material or is provided with window cut outs for transmission of light passing through the active portions 15.

The individual electro-optically active portions 15 are preferably composed of barium titanate ($BaTiO_3$) crystals which are maintained above the Curie temperature. Conventional heating apparatus can be employed for this purpose. In order to avoid unnecessary complexity in the drawings, such apparatus is not shown. While other materials are available which display the Kerr electro-optical effect, barium titanate crystals are preferred because, when maintained above their Curie temperature, they are operative at extremely high speeds with applied voltage signals of smaller magnitude than required with other electro-optically active materials. Electrodes for the application of switching voltages may be provided, for instance, at the right and left edges of each of the crystals 15 as respectively indicated at 28 by known methods such as by vapor deposition. To these electrodes, suitable switching voltage connections may be provided as indicated at 30. For purposes of clarity, not all of the connections at 30 are shown. Appropriate electric signal voltages are provided to the coordinate arrangement of the structure 14 from a character decoder 36 through cable 38. These signal voltages are provided in response to input information to the apparatus in the form of electrical signals through an input connection 46 to the character decoder 36.

A suitable conventional mechanism may be provided for imparting an indexing rotational movement to the reflective mirror structure 20. This may consist of a suitable ratchet wheel 40 which is connected to the reflective structure 20 by means of a shaft schematically indicated at 42. The ratchet wheel 40 is rotated in an indexing manner by a solenoid actuator 44 having a winding 48 which is energized through connections 50 from the character decoder 36. Each time a new character is formed in response to an input signal, the character decoder subsequently provides a pulse of current through the connections 50 to the solenoid actuator 44 to index the reflective mirror structure 20 to the next succeeding position in readiness for the next character.

Upon completing of a full line, the line indexing movement of the paper 24 is also provided through the movement of the ratchet wheel 40 by means of the following associated mechanism: The paper supporting roller 52 is connected by means of a shaft schematically indicated at 54 to a cog wheel 56. A dog 58 is arranged to engage one of the teeth of cog wheel 56 upon each revolution of the ratchet wheel 40 so as to provide the required movement of paper 24. A spring biased idler cam 59 is provided to engage the teeth of cog wheel 56 to firmly hold the indexed positions of the paper 24. A similar arrangement may be employed to hold the indexed positions of ratchet wheel 40.

The input signals received at connection 46 can be in the form of coded electric signals or pulses which are decoded by the decoder 36 to provide energization through connections 30 of desired electro-optically active material portions 15 to display a decoded character. The input signal through the input cable 46 may differ in various ways in order to signify different characters. For instance, different frequencies of different pulse durations or combinations may be employed. Or cable 46 may be a multiple conductor cable with a signal provided on a different conductor for each different desired character. In any case, the design of the character decoder can be along conventional lines and within the skill of those familiar with the electrical and electronic arts.

It is possible to avoid the necessity for indexing movement of the paper 24 to provide space for each successive line. This may be accomplished by providing a continuous movement of the paper 24 at a speed sufficient to provide space for each succeeding line upon the completion of the preceding line. By a proper tilting adjustment of the mirrors 26, about an axis within a plane substantially parallel to the surface of the drawing, each of the characters can be focused upon the paper 24 in a vertically adjusted position so as to compensate for the gradual upward movement of the paper 24 so that all of the characters in each line will be horizontally aligned properly.

With such continuous movement of the paper 24, the cog wheel 56 and dog 58 can of course be replaced by a suitable synchronous electric motor which is properly geared down to provide the desired paper speed.

Similarly, when very fast operation of the apparatus is contemplated and when sufficiently sensitive photographic paper 24 is available, it has been found that it is not absolutely essential to provide an indexing movement of the reflective mirror structure 20, but that a properly synchronized continuous rotational movement of structure 20 is possible. This is very desirable because it avoids the necessity for acceleration and deceleration of mechanical parts. Here again the ratchet wheel 40, and the solenoid actuator 44, may be replaced by a synchronous electric motor which is properly geared to give the desired speed.

While the reflective mirror structure 20 is preferred for the purpose of changing the direction of the light beams forming the focused character image, it will be obvious that it is possible to employ other known devices for the purpose of changing the direction of the light beams whenever such other structures may be more convenient. An example of another suitable light direction changing device is a prism. It is possible to combine the lens 18 with such a prism structure and to have a series of different prism lenses 18 which are indexed into position for the purpose of transmitting the character beam. Various other modifications will occur to those skilled in the art.

As previously mentioned above, barium titanate crystals are the preferred electro-optically active materials in the apparatus of the present invention. As previously indicated, the barium titanate is maintained at a temperature above its Curie point. Barium titanate is not ordinarily birefringent when maintained above its Curie temperature. However, when subjected to an electric field the material becomes birefringent. The light output of a system wherein a crystal of barium titanate, maintained above its Curie temperature, is placed between a pair of cross polarizers, varies with the sine squared of the ratio of the applied voltage to a constant for the particular crystal used. The curve depicting this relationship contains a plurality of nulls and peaks and by applying voltage signals of predetermined magnitude to a pair of electrodes on such a crystal, switching can be accomplished as desired.

A more detailed description of the operation of the light valve arrangement is as follows: The light source 10 is preferably a very powerful source such as an arc lamp and it is preferably provided with a suitable reflector to concentrate the entire light output upon the first polarizer 12. As previously indicated, the directions of light acceptance (or polarization) of the polarizers 12 and 16 are angularly displaced with respect to one another, preferably by approximately 90° as respectively indicated by arrows 60 and 62. These polarizers are effective, when no voltage is applied to the optically active portions 15, to prevent any light from reaching the output side of the polarizer 16.

The polarizer 12 is effective to absorb all of the incident light except a component in one predetermined direction as indicated by arrow 60, and thus the light incident on crystal portions 15 is plane polarized. When no voltage is applied to crystal portions 15, this plane polarized light is passed through the crystal undisturbed and is incident on polarizer 16. The direction of acceptance of polarizer 16 as indicated by arrow 62 is substantially at right angles to the direction of acceptance of polarizer 12 and thus all of the incident light is absorbed and no light passes beyond polarizer 16.

The plane polarized light incident upon the crystal portions 15 may be considered to have two components in a plane normal to the direction of propagation, one perpendicular to the electrodes 28 and one parallel to the direction of the electrodes. When the crystal is in an unbiased condition, the light incident on the crystal passes therethrough undisturbed. However, when a voltage is applied between the electrodes 28, the barium titanate becomes birefringent and, therefore, the component of the incident light vector perpendicular to the electrodes propagates through the crystalline material at a greater rate than the component at right angles to the applied electric field. The light component parallel to the applied field is usually termed the extraordinary ray and that normal to the applied field the ordinary ray and where, as here, the extraordinary ray propagates through the material at a rate greater than the ordinary ray, the phenomenon is known as positive birefringence. As a result of the aforesaid difference in the rate of propagation in the crystal of the ordinary and extraordinary rays, the crystal is effective to rotate the plane of polarization of the light passing therethrough and the light leaves the crystal portion 15 "eliptically polarized" and containing a component parallel to the direction of acceptance of polarizer 16. In order to rotate the plane of the light passing through a crystal portion 15, it is necessary that the light contain components in directions both normal to and parallel to the electrodes 28. Thus, the direction of acceptance of polarizer 12 must not be parallel to either of these two directions if the light is to be rotated by applying an electric field to the crystal.

It will be understood that the apparatus of the present invention may be modified by arranging the second polarizer 16 with a polarization angle as indicated by arrow 62 which is co-incident with the angle 60 of the first polarizer 12 so that all of the light which is polarized by polarizer 12 will be transmitted through the crystal portions 15 and the polarizer 16 unless the crystal portions 15 are energized. In such a modification the rotated output from the energized crystal portions 15 is then blocked from transmission by the polarizer 16. Thus, it is possible to modify the arrangement so that energization of crystal portions 15 causes blocking, where transmission otherwise would occur; rather than transmission, where blocking would otherwise occur.

Using either method of light switching, it will be recognized that it is possible to employ the apparatus of this invention to transmit full background patterns of light spots which are interrupted in appropriate positions to form characters. Reverse printed characters are thus possible.

As taught in a related prior application, Serial No. 645,995, filed March 14, 1957, by Albert C. Koelsch and Donald R. Young, and assigned to the assignee of the present application, the light output of a light switch employing two polarizers and an electro-optically active crystal with electrodes arranged as shown on crystal elements 15 is proportional to the square of the sine of the ratio of the applied voltage to a constant which is determined by the particular crystal. Accordingly, the curve of light output versus voltage has a series of peaks and nulls and it is important, therefore, to employ an energization voltage which is sufficient to hit a peak when a maximum switching effect is desired. It will be understood, of course, that various combinations of input voltages may be employed to achieve the desired optic effect. Also it may be desirable to supply alternating voltages to the crystals rather than direct current voltages.

It is obvious that the present optical apparatus can be employed for display and printing methods other than on light sensitive chemically photographic surfaces. For instance, the present apparatus can also be used for optical discharging of localized areas of a xerographic plate for subsequent use in making xerographic reproductions. Also, a display may be made optically visible by directing the output beam upon a light sensitive cell which has an optical memory operating on a principal such as fluorescence or phosphorescence.

An excellent high speed of operation is possible by use of the present invention. As pointed out in the related application Serial No. 645,995, these electro-optically active valves are capable of very rapid response in periods which are so brief as to be measured in millimicro-seconds. Accordingly, the speed with which the present system is capable of operating is primarily limited by the sensitivity of the photographic paper 24 and the speed with which the mirror structure 20 and the paper 24 can be effectively moved to synchronize with the operation of the rest of the system. Accordingly, it is possible to employ the display and printing arrangement of the present invention to accomplish the work which previously required the simultaneous operation of a number of slower printing mechanisms.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Display apparatus comprising first and second polarizers having a pre-determined angular relationship between their respective axes of polarization, an electro-optically active structure positioned between said polarizers and having a plurality of pairs of electrodes associated with a regular pattern of optically active portions of said structure, said active portions being responsive to voltages applied by the associated pairs of electrodes to change the angle of polarization of light passing therethrough to thus change the light transmission through the combination of said polarizers and said active portions, means for concurrently energizing selected electrode pairs to form a desired character pattern of transmitted light, a substantially flat light sensitive medium, a plurality of movable optical light direction changing devices arranged for sequentially intercepting character patterns of transmitted light from said polarizers and for directing the character patterns in different directions to desired positions upon said light sensitive medium to form an organized display of the character information.

2. Display apparatus comprising first and second polarizers having respectively displaced axes of polarization, an electro-optically active structure positioned between said polarizers and having a plurality of pairs of electrodes associated with a regular pattern of optically active portions of said structure, said active portions being responsive to voltages applied by the associated pairs of electrodes to change the angle of polarization of light passing therethrough from the polarization angle of said first polarizer to the polarization angle of said second polarizer, means for energizing selected electrode pairs to form a desired character pattern of transmitted light, a substantially flat light sensitive medium, a plurality of movable optical light direction changing devices arranged for sequentially intercepting character patterns of transmitted light from said polarizers and for directing the character patterns in different directions to desired positions upon said light sensitive medium to form an organized display of the character information.

3. Apparatus for rapidly converting electrical signal information into a visible display form comprising a first polarizer having an axis of polarization, a second polarizer positioned with a displaced axis of polarization to receive and interrupt light transmitted through said first polarizer, an electro-optically active structure positioned between said polarizers to intercept light traveling therebetween and having a plurality of pairs of electrodes associated with a regular pattern of optically active portions of said structure, said optically active portions being responsive to voltages applied to the associated pairs of electrodes to change the polarization of light passing therethrough from said first polarizer to an angle which will pass through said second polarizer, means for energizing selected electrode pairs to form a desired character pattern of transmitted light, a substantially flat light sensitive medium, a plurality of movable optical light direction changing devices arranged for sequentially intercepting character patterns of transmitted light from said polarizers and for directing the character patterns in different directions to desired positions upon said light sensitive medium to form an organized display of the character information.

4. Display apparatus comprising aligned first and second polarizers having axes of polarization respectively displaced sufficiently to substantially block the transmission of light therethrough, an electro-optically active structure positioned between said polarizers having a regular pattern of optically active portions, a pair of electrodes associated with each of said active portions, said active portions being responsive to voltages applied by the associated pairs of electrodes to change the angle of polarization of light passing therethrough from the polarization angle of said first polarizer to the polarization angle of said second polarizer to thus provide for transmission of light through both of said polarizers, means for selecting and energizing combinations of electrode pairs to form a desired character pattern of transmitted light, a light sensitive medium, and means including a plurality of movable optical light beam direction changing devices arranged for positioning for sequentially intercepting each character pattern of transmitted light and arranged to focus each such intercepted character pattern upon different related positions upon said light sensitive medium.

5. Display apparatus comprising aligned first and second polarizers having axes of polarization respectively displaced sufficiently to substantially block the transmission of light therethrough, an electro-optically active structure positioned between said polarizers having a regular pattern of optically active portions, a pair of electrodes associated with each of said active portions, said active portions being responsive to voltages applied by the associated pairs of electrodes to change the angle of polarization of light passing therethrough from the polarization angle of said first polarizer to the polarization angle of said second polarizer to thus provide for transmission of light through both of said polarizers, means for selecting and energizing combinations of electrode pairs to form a desired character pattern of transmitted light, a light sensitive medium, a movable light direction changing structure positioned to intercept each character pattern of transmitted light and arranged for movement to sequentially direct successive character patterns to different related positions upon said light sensitive medium, and a lens arranged in the path of said character pattern of transmitted light for focusing said directed character patterns upon said light sensitive medium.

6. Display apparatus comprising aligned first and second polarizers having axes of polarization respectively displaced sufficiently to substantially block the transmission of light therethrough, an electro-optically active structure positioned between said polarizers having a regular pattern of optically active portions, a pair of electrodes associated with each of said active portions, said active portions being responsive to voltages applied by the associated pairs of electrodes to change the angle of polarization of light passing therethrough from the polarization angle of said first polarizer to the polarization angle of said second polarizer to thus provide for transmission of light through both of said polarizers, means for selecting and energizing combinations of electrode pairs to form a desired character pattern of transmitted light, a light sensitive medium, a multiple mirror structure having a plurality of individual reflective surfaces arranged for sequential positioning for intercepting and reflecting each character pattern of transmitted light to said light sensitive medium, a lens arranged between said second polarizer and said mirror structure for focusing the reflected character image upon said light sensitive medium, the individual reflective surfaces of said mirror structure being arranged at varying reflection angles to sequentially position the reflected character patterns to desired related positions upon said light sensitive medium.

7. Display apparatus comprising aligned first and second polarizers having axes of polarization respectively displaced sufficiently to substantially block the transmission of light therethrough, an electro-optically active structure positioned between said polarizers having a regular pattern of optically active portions, a pair of electrodes associated with each of said active portions, said active portions being responsive to voltages applied by the associated pairs of electrodes to change the angle of polarization of light passing therethrough from the polarization angle of said first polarizer to the polarization angle of said second polarizer to thus provide for transmission of light through both of said polarizers, means for selecting and energizing combinations of electrode pairs to form a desired character pattern of transmitted light, a light sensitive surface medium, a cylindrical reflective mirror structure having a plurality of distinct mirror surfaces arranged at the periphery thereof and positioned to intercept and reflect the character patterns of light transmitted through said second polarizer, said mirror surfaces being arranged at varying angles to sequentially direct character patterns to different desired related positions upon said light sensitive medium to form an organized visual display thereon, and a lens arranged between said second polarizer and said reflective mirror structure for focusing each reflected character pattern at the reflected position upon said light sensitive medium.

8. A display apparatus in accordance with claim 1 in which the optically active portions of the electro-optically active structure consist essentially of a material displaying the Kerr electro-optical effect.

9. A display apparatus in accordance with claim 8 in which the material displaying the Kerr electro-optical effect consists essentially of barium titanate crystals.

References Cited in the file of this patent

UNITED STATES PATENTS 2,322,602 Terry ---------------- June 22, 1943